March 23, 1971 B. W. GRAYSON 3,572,245
APPARATUS AND METHOD OF CONDUCTING STRING SHOT OPERATIONS
Filed April 10, 1970 3 Sheets-Sheet 1
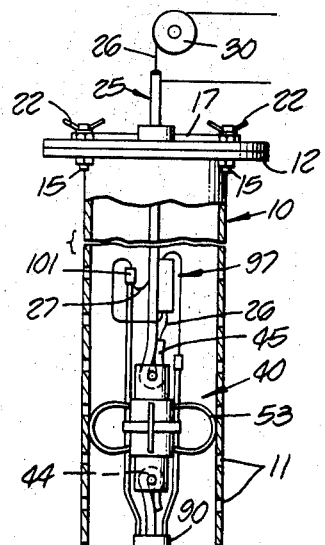
FIG. 1.
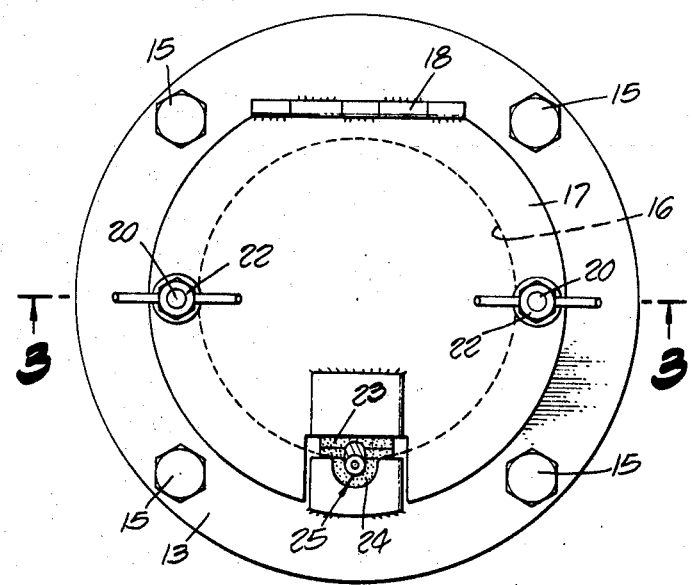
FIG. 2.
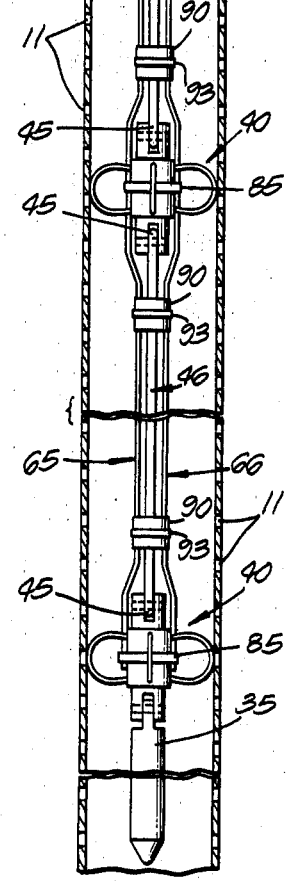
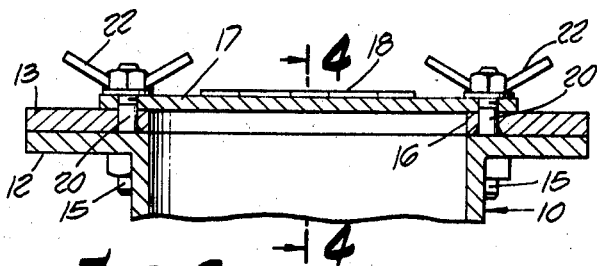
FIG. 3.
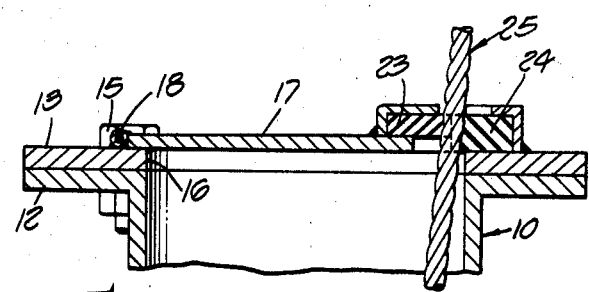
FIG. 4.
INVENTOR
BOBBY W. GRAYSON
BY
ATTORNEYS

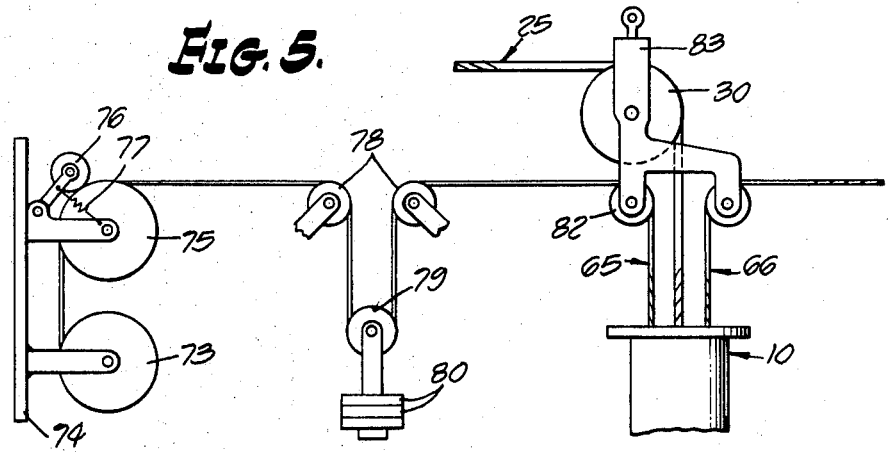
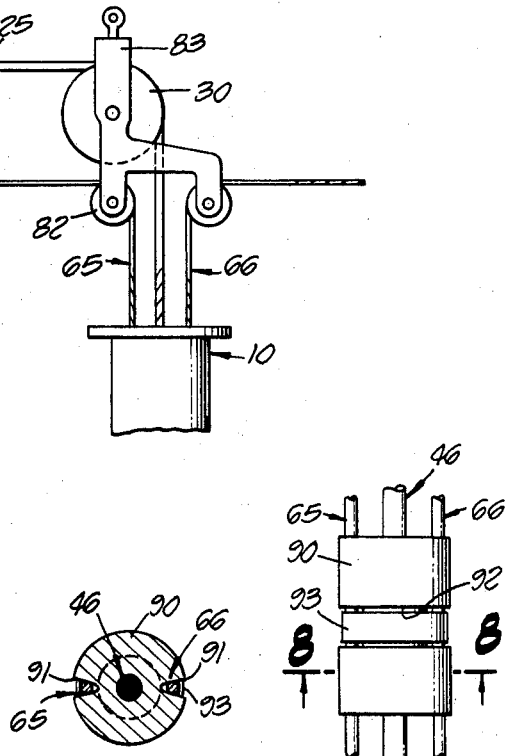
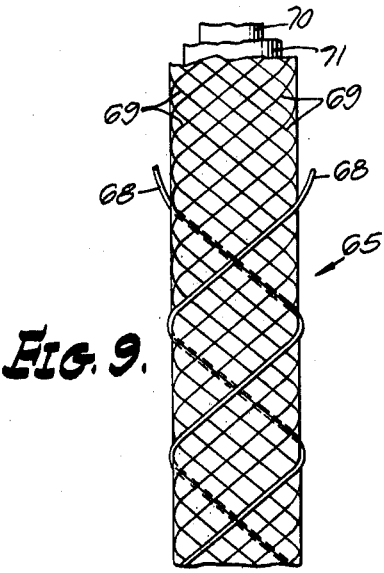
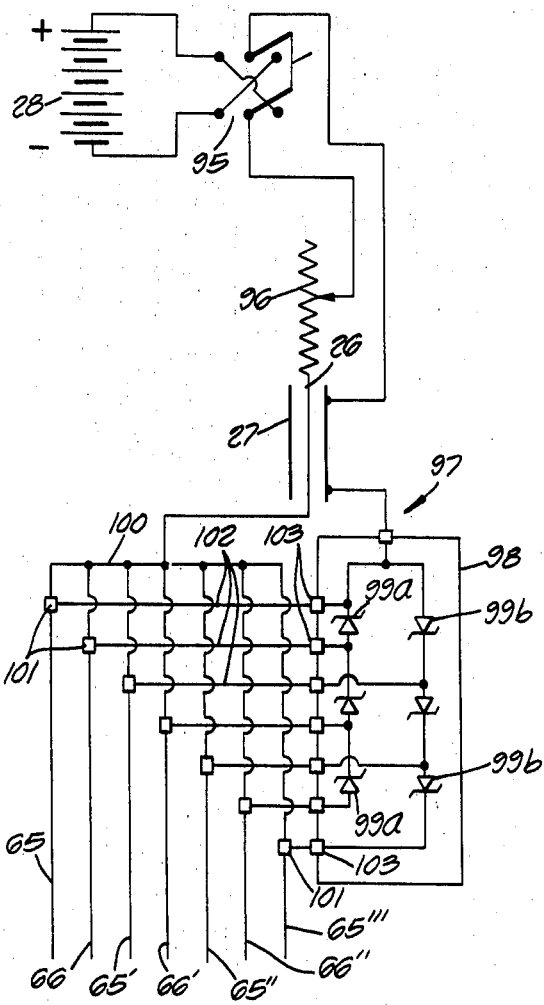

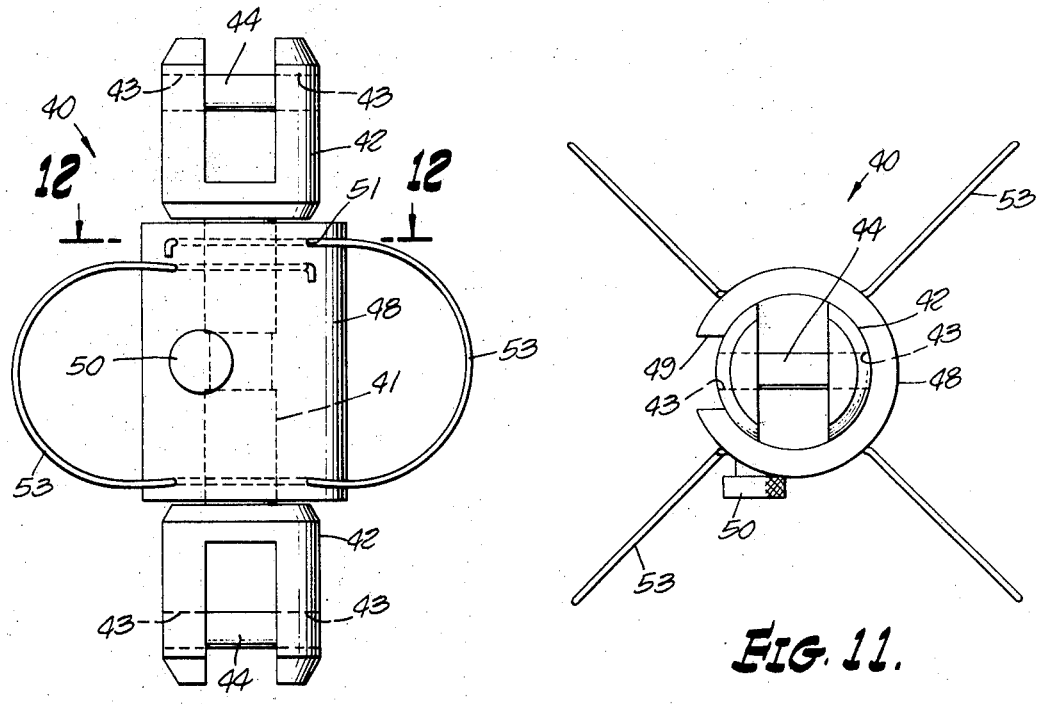
FIG. 10.
FIG. 11.
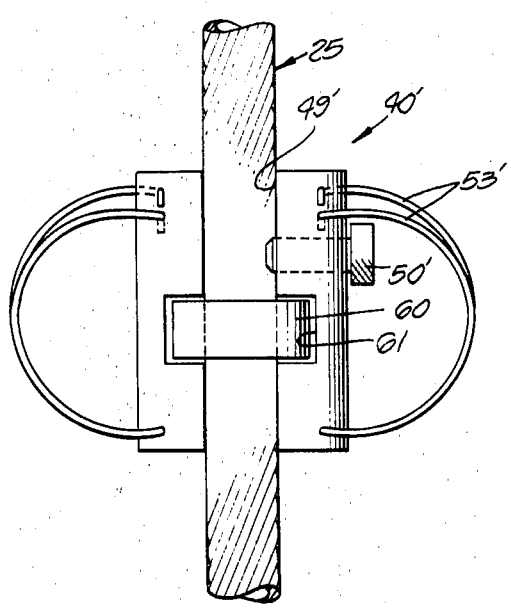
FIG. 13
FIG. 12.
INVENTOR
BOBBY W. GRAYSON
BY
ATTORNEYS United States Patent Office 3,572,245
Patented Mar. 23, 1971

3,572,245
APPARATUS AND METHOD OF CONDUCTING
STRING SHOT OPERATIONS
Bobby W. Grayson, 7306 Pembroke Ave.,
Oildale, Calif. 93308
Filed Apr. 10, 1970, Ser. No. 27,214
Int. Cl. F42b 7/00
U.S. Cl. 102—20          32 Claims

ABSTRACT OF THE DISCLOSURE

String shot apparatus and method of servicing perforated well casing using one or more explosive cords supported along a wire line and equipped with discriminator means for detonating the cords independently or in groups at the operator's option. The wire line includes centralizers designed to be quickly assembled to and detached from the line as well as means for securing the explosive cord to the line in a desired degree of tautness. The explosive cord includes means for eliminating stretch and preferably embodied therein to safeguard against its elongation by frictional or other forces encountered during the servicing operation. A readily opened and closed blowout protector is securable across the well head to seal the well closed about the wire line to avoid a blowout if the servicing operation releases high subsurface pressures into the well.

---

This invention relates to string shot apparatus and more particularly to an improved method and apparatus for performing a cleaning and reconditioning operation in a well using one or more explosive cords and including means for activating one or a series of string shot operations carried out at any desired time intervals during a single wire line "run in" operation.

The string shot technique employed to perform servicing operations in oil wells and to improve the flow by clearing away material tending to clog the flow perforations is subject to many shortcomings and disadvantages avoided by the present invention. This technique utilizes an explosive cord supported along the side of a wire line and lowered to position the cord opposite a section of perforated casing to be cleared of debris. It is not possible to determine the cause or seriousness of the clogged condition and more particularly how strong an explosive charge is required to clear the perforations yet avoid risk of damage to the casing. It is costly and time consuming to carry out a string shot operation and this encourages the operators to use an excessively powerful charge to avoid having to perform several run in operations. Not infrequently, the extra strong charge seriously damages the casing.

Attempts to use explosive cords of low power or strength are uncertain and often result in failure or produce serious damage to the casing or parting of the wire line and loss of the weight required to pull the line into the well for quite different reasons. For example, in certain instances the cords fail to explode or explode over only a small portion of their full length due to a failure of flame propagation along the cord. For reasons that have not been understood prior to the present invention, these lower strength lines would explode over only a short portion of their upper lengths. In other instances either the wire line was severed or serious damage caused to the casing, or both, for reasons not understood or readily explained. It has been discovered that, in most instances, these accidents are produced by stretching of the cord due a number of factors including the adverse effect on the cord of the very substantial sub-surface ambient temperatures customarily encountered at lower levels in oil wells and to the high drag forces acting on the cord as it is lowered through the mud and other fluids customarily present in a well. As a result of this stretching the distance between adjacent grains leads to propagation failure. It can also result in excess portions of the stretched cord collecting in a loop adjacent an anchorage connection between the cord and the wire line. Upon detonation of the loop, an unusually powerful blast is produced in a localized area of the well which not infrequently cuts the wire line and releases the line weight but can cause serious damage to the casing itself.

It has been proposed heretofore to assemble a pair of explosive cords in parallel along the wire line and to explode them separately either by using a single or separate pairs of electrical leads. If the same pair is used, then both cords are set off in fast unregulatable sequence. The use of separate lead wires for each explosive cord enables the operator to vary the interval between detonations but is subject to the serious disadvantage of having to provide and protect separate leads for each charge. This complicates the equipment and servicing operation and involves the risk of severing one or more of the lead-in wires and greatly increases the risk of malfunctions as well as the maintenance and handling costs.

Other problems associated with string shot operations as heretofore conducted involve the problem of equipping the wire line with centralizer devices to hold the line out of contact with the casing side wall and couplings during the run-in and pull out cycle as well as to safeguard the explosive cord against damage during the lowering operation. These centralizers are required at frequent intervals along the wire line and their presence on the line interferes with reeling and storage of the line.

The foregoing and other serious disadvantages accompanying string shot operations as heretofore conducted are avoided by the present invention using the equipment and the improved techniques provided by this invention. A simple wire line is employed having a central conductor and a second conductor comprising the metallic sheath of the line which are utilized to supply the electrical energy required to detonate one or a series of explosive cords in any desired time interval or simultaneously in one or more groups if so desired. Explosive cording incorporating means safeguarding against stretch and malfunctioning of the cord makes possible the use of lower strength cord than heretofore possible and numerous other advantages.

An improved centralizer construction permits the centralizer to be installed and removed from the wire line expeditiously at the well head. After the main body of the centralizer has been detached, the wire line can be compactly reeled on the take up spool or storage reel. As soon as the centralizer is installed on the wire line one or more lengths of explosive cord can be secured to the periphery of its main body following which the wire line is lowered into the well until in position to receive the next centralizer.

The selective detonation of explosive cords via a single pair of conductors is made possible by unique electrical discriminator means connected between one of the conductive paths and the detonators for each cord. Typically the discriminator utilizes semi-conductors arranged to pass electrically energy only to a particular cord or to a set of cords selected for detonation at a particular time. Greater versatility is achieved by utilizing the discriminator in combination with a reversing switch and means for controlling the applied potential.

Another feature of the invention is the provision of a blowout protector of simple unique design across the well head. This protector includes a cover having a non-conductive gasket which fits tightly about the wire line in the closed position of the protector and which opens for the full diameter of the casing whenever the wire line is being lowered or withdrawn.

Accordingly, it is an object of the present invention to provide a unique, improved apparatus and method for conducting string shot operations in a well.

Another object of the invention is the provision of a method and apparatus for detonating multiple string shots to recondition a well during a single wire line run in operation.

Another object of the invention is the provision of apparatus utilizing a two conductor wire line to detonate one or more string shots simultaneously or in any desired order and time intervals.

Another object of the invention is the provision of an explosive cord constructed to resist malfunctioning and stretching while being lowered into a well.

Another object of the invention is the provision of an explosive cord having built in stretch control means.

Another object of the invention is the provision of an improved centralizer readily installed on and removed from a wire line at intervals therealong as the line is being lowered into or withdrawn from a well.

Another object of the invention is the provision of a simple, easily operated blow out protector installable on a well head and sealable against a wire line having an electrical conductor along its exterior.

Another object of the invention is the provision of reusable discriminator means for use in combination with a plurality of explosive cords and operable with a two conductor wire line to activate the explosive cords individually during a single wire line run in operation.

These and other more specific objects will appear upon reading the following specification and claims and upon considering in connection therewith the attached drawing to which they relate.

Referring now to the drawing in which a preferred embodiment of the invention is illustrated:

FIG. 1 is a vertical sectional view of a well having a perforated casing and showing an illustrative embodiment of the invention string shot apparatus in position for detonation of its separate cords;

FIG. 2 is a top plan view on an enlarged scale of the blowout protector closed against the well head;

FIG. 3 is a cross sectional view taken along line 3—3 on FIG. 2;

FIG. 4 is a cross sectional view taken along line 4—4 on FIG. 3;

FIG. 5 is a diagrammatic elevational view at the well head showing details of the means for installing the explosive along the wire line at a desired uniform tension;

FIG. 6 is a schematic view of an illustrative embodiment of the electrical firing circuit for a plurality of explosive cords;

FIG. 7 is an elevational view on an enlarged scale of means for securing the explosive cords to an adjacent portion of the wire line;

FIG. 8 is a cross sectional view taken along line 8—8 on FIG. 7;

FIG. 9 is a fragmentary enlarged view of the explosive cord;

FIG. 10 is an elevational view of one preferred embodiment of the wire line centralizer;

FIG. 11 is a top plan view taken on FIG. 10;

FIG. 12 is a cross sectional view taken along line 12—12 on FIG. 10; and

FIG. 13 is an elevational view of a second preferred form of the centralizer assembled to the wire line.

Referring initially and more particularly to FIG. 1, there is shown an oil well casing 10 having a multiplicity of flow perforations 11 distributed along its side wall at the production flow level. It will be understood that these perforations may be distributed over many feet of the casing and in one or more areas of the casing. Secured to the top of the casing is a radial flange 12 to which a blow out protector mounting ring 13 is detachably secured, as by bolts 15. This ring has a central opening 16, corresponding to the I.D. of the casing so as not to restrict the entrance to the well. Opening 16 is provided with a cover 17 here shown as formed in a single part and equipped with a hinge 18 secured to mounting ring 13. However, it will be understood that cover 17 may be formed in two halves each having its own hinge connection with mounting ring 13 if so desired. Threaded studs 20 welded or otherwise secured to mounting ring 13 pass through openings in cover 17 and support thumb nuts 22 for clamping the cover firmly sealed closed prior to a string shot firing operation.

Suitably secured to cover 17 and mounting ring 13 is a two part or split sealing gasket 23, 24 having its edge portions shaped to clamp snugly about the wire line 25 when cover 17 is closed. Each of the gasket halves 23, 24 are suitably and firmly anchored to the cover and to the mounting ring as in the manner indicated in FIGS. 2 and 4. These non-conductive sealing gaskets not only provide a fluid-tight seal about the wire line but isolate the line and its conductors electrically from the casing.

Wire line 25 includes a central conductor 26 separated from the helical sheath conductors 27 which also serve as the second conductive path employed as will be explained presently to provide one portion of the electrical circuit between the direct current power source 28 (FIG. 6) and one or more string shots. Typically wire line 25 passes over a guide pulley 30 overlying the well and thence to a storage reel, not shown, but of any suitable well known construction driven by reversible power means for handling the wire line.

Referring now more particularly to FIGS. 1, 10, 11 and 12, it will be understood that wire line 25 includes a weight 35 at its lower end of adequate size to facilitate the expeditious lowering of the wire line into the well through the thick fluids generally present in the well. Distributed along the lower portion of the wire line at suitable intervals, as 10 to 25 feet, are a plurality of centralizers 40, 40. As is best shown in FIGS. 10 to 12, each centralizer includes a mandrel 41 having a diameter similar to that of wire line 25 and provided at its opposite ends with yokes 42. These yokes are formed with aligned openings 43 each equipped with a pivot pin 44 suitably secured in place and extending through a loop 45 of the wire line or of a similar cable 46 interconnecting adjacent ones of the centralizer mandrels.

Loosely fitting over the mid-portions of mandrels 41 is the main body 48 of the centralizer. This main body is generally cylindrical in contour and has a long deep slot 49 opening through one side wall and sized to fit readily over mandrel 41. Main body 48 is slightly shorter than the distance between the adjacent ends of yokes 42, and is formed with a threaded bore seating a thumb screw 50 having a knurled head. Its inner end extends into slot 49 in position to engage the mandrel and hold the centralizer body firmly locked in assembled position in the manner made clear by FIG. 12.

Extending crosswise of the opposite ends of the centralizer bodies 48 are pairs of passages 51 loosely seating highly tempered wire loops 53. As herein shown, each centralizer is provided with a single pair of these wire loops shaped as best shown in FIG. 10 and each including oppositely directed semicylindrical loops projecting radially from the side wall of main body 48. Since each of these loops lies at an angle to the portions located in passages 51, the loops are held against sliding movement lengthwise of these passages. The radial extent of each of the loops is such that they cooperate in holding the wire line loosely centralized in the well casing.

A second and simpler embodiment of the invention centralizer 40′, illustrated in FIG. 13, may be mounted directly on wire line 25 at any suitable spacing therealong. For this purpose the wire line is provided with collars 60 telescoped over one end of the wire line and then subjected to high pressure contraction forces adequate to squeeze the ductile collar material into interlocking gripping action with the wire sheath of the wire line. It will also be understood that the collars may be brazed or otherwise firmly secured to the wire line. These collars pass readily over the storage reel for the wire line.

The main body 48' of the centralizer is formed with slot 49' similar to the corresponding slot in FIGS. 10 to 12 and sized to fit readily over the wire line. Intermediate the opposite ends of this slot there is an enlarged U-shapd recess 61 shaped to fit loosely about and accommodate collar 60 in the manner made clear by FIG. 13. A thumb screw 50' is carried in main body 48' and serves similarly to the corresponding thumb screw in FIGS. 10 to 12 to hold the centralizer assembled to the wire line. Additionally main body 48' is equipped with wire loops 53' in the same manner described above in connection with FIGS. 10 to 12. It is therefore evident that the thumb screw 50' holds the centralizer detachably assembled to the wire line whereas collar 60 cooperates with recess 61 to hold the centralizer against movement longitudinally of the wire line. The simplified centralizer avoids the need for the yoke-equipped mandrels as well as for separate lengths of cabling 46 interconnecting adjacent centralizers.

The assembly of the explosive cord through the wire line will now be described with the aid of FIGS. 1 and 5. The crew attaches weight 35 to the lowermost end of the wire line and inserts this weight into the top of the well. As shown in FIGS. 1 and 5, only a pair of explosive cords 65, 66 are shown. In many operations a single pair suffices but in others it may be desirable to fit the wire line with a larger number of string shots. In this case, it is usually preferable to use explosive cord of considerably smaller size and explosive power than that heretofore employed. For example, it has been common practice heretofore not to use explosive cord smaller than 25 grain size in string shot operations. However, by this invention it is feasible and advantageous to use cord of the smallest commercial size, namely four grain as well as various sizes intermediate four grain and 25 grain provided adequate precautions are taken against elongation of the cord while being lowered into the well. Such precautions may comprise firm anchorage of the cord to the wire line at closely spaced intervals and/or the use of cord in accordance with the present invention incorporating built-in stretch resisting means such as non-stretching small wires or other high strength non-stretching filaments 68, 68. These may take the place of a corresponding number of filaments of the outer protective sheath of the cord in the manner shown in FIG. 9. As there shown, the non-stretching filaments 68 are wrapped spirally in opposite directions between adjacent spiral wrappings 69, 69 of the conventional cord sheath. It will be understood that the explosive cord is otherwise of any suitable conventional design including a central core of explosive material 70 encased within a tough flexible tubular shroud 71 of plastic or the like. The latter is embraced by the wax covered braided sheath 69, 69.

It is important and desirable that the exposive cord 65, 66 be assembled length-wise of the wire line in a taut condition and preloaded to a suitable uniform tension. According to this invention, this is accomplished in the manner illustrated in FIG. 5 and showing the tensioning equipment for one only of the cords, it being understood that cord 66 passes over similar automatic tensioning equipment. The cord passes from a supply reel 73 mounted on a suitable support 74, and thence over an idler pulley 75. The cord is held firmly seated on pulley 75 by a pivotally supported idler pulley 76 and a tension spring 77. The cord then passes over a pair of iders 78 between which there is mounted a pulley 79 on which any suitable member of removable tension-regulating weights 80, 80 can be mounted. The cord then passes over an idler 82 carried by the hanger 83 for wire line guide pulley 30, pulley 82 being appropriately positioned close to one side of the wire line at the point of entry into the well head.

It will be understood that the wire line leaves the power-driven wire line reel carrying only mandrels 41 or their equivalent such as collars 60 (FIG. 13). As these components approach entry into the well head, the wire line is stopped while the crew inserts the main body 48 or 48' of the centralizer and secures it in place by tightening thumb nut 50 or 50'. At the same time the explosive cords are securely anchored to the main body of the centralizer by serving the same with tapes or tiebands 85 (FIG. 1). The crew then proceeds to lower the wire line along with the attached explosive cords under appropriate tension as determined by the weights 80 carried by the pulley 79. Centralizers continue to be assembled to the wire line in succession and anchored to the explosive cords as described.

If the centralizers are spaced considerable distances apart or in cases where smaller size explosive cord is being used, it is desirable to anchor the cords to the wire line at one or more points between adjacent centralizers. This is done using cylinders 90 constructed as shown in FIGS. 7 and 8. These anchor members are secured to the wire line by swaging, brazing or other suitable means. Each member 90 is formed with long grooves 91 of V-shape in cross section extending lengthwise of the body and sized to grip cords 65, 66 firmly irrespective of the particular size being used. A deep annular groove encircling the mid-portion of member 90 accommodates tape or banding 93 applied over the cords 65, 66 to clamp the latter firmly within grooves 91.

The equipment employed in connection with the two conductors 26, 27 of the wire line to detonate the explosive cords according to one preferred embodiment is illustrated schematically in FIG. 6. The upper ends of conductors 26, 27 are connected to battery 28 by way of a double throw reversing switch 95 and a rheostat 96. The lower end of the wire line closest to the upper end of the explosive cords is connected to the cord by way of an electrical discriminator 97. This discriminator preferably comprises a thick-walled tubular housing 98 of nonconductive material charged with potting compound encapsulating at least one and preferably several semiconductors 99a, 99b, connected in series parallel with one of the wire line conductors as conductor 27. The other conductor 26 is connected to a common bus 100 connected in turn to one terminal of each of the cord detonators 101. The other lead 102 of each detonator is connected to a terminal post 103 in the side wall of discriminator 98 and connected as shown in FIG. 6 to a respective one of the semi-conductors 99a, 99b.

The detonators 101 are preferably arranged in vertically staggered relation as indicated in FIGS. 1 and 6 and are sufficiently spaced from one another that the detonation of one does not cause detonation of any other detonator, or the premature ignition of any explosive cord.

In some service operations only two or three explosive cords are secured to the wire line during single run in operations. In this case, ordinary diodes may be used. However when employing a larger number of string shots, such as is indicated in FIG. 6 at 65', 66', 65'', 66'', 65''', then it is desirable to employ Zener-type diodes 99a, 99b of an appropriate voltage rating to be triggered by a particular voltage applied thereto by adjusting the contactor of rheostat 96. It will be noted that diodes 99a are connected in series to pass current of a particular polarity whereas diodes 99b are connected in series with one another in a parallel circuit and are triggered to pass current only by voltage of an opposite polarity.

The operation of the equipment will now be described, it being assumed that perforations 11 of well casing 10 are plugged with sand or other debris interfering with the well flow. To remove this debris and restore full flow conditions, the service crew connects the blowout preventor assembly to the top of the well casing using assembly bolts 15 and then proceed to lower weight 35 of the wire line toward the well head. As this weight is about to disappear into the casing the main body assembly 48 of the first centralizer is inserted crosswise of the wire line and locked in place by tightening thumb screw 51. The selected number of string shot cords are then threaded through the tension control equipment shown in FIG. 5 and their free ends are firmly secured to the opposite sides of the first centralizer by banding 85. The wire line is then lowered into the well and successive ones of the centralizer bodies are assembled to the line and taped in place. If the intermediate cord anchorages 90, such as those shown in FIGS. 6 and 7 are employed, the explosive cords are inserted into the V-shaped slots 91 of these anchorages and taped firmly in place.

After all of the centralizers have been installed and the tensioned explosive cords have been secured to the sides of the wire line in the manner just described, their upper ends are cut off in echelon and each is provided with a detonator cap 101 and connected in circuit with a respective terminal 103 of discriminator 97. The lead wires to the discriminator and to the detonator bus 100 are also completed following which the wire line is lowered into the well until the string shots are located directly opposite the perforations to be cleared of debris. Cover 17 of the blowout preventor is then closed and locked in place by thumb nuts 22 to avoid any possibility that the string shot operations will open a high pressure area of the earth formation into the well and initiate high pressure flow from the top of the well.

Before closing switch 95, the operator makes certain that rheostat regulator 96 is adjusted to its upper end or a harmless position ineffective to activate any detonator. The switch is then closed and the first cord is fired by adjusting rheostat 96 downwardly until the voltage increases sufficiently to fire the first string shot 65. No one of the other string shots 66, 66' or 66'' will fire because the voltage is inadequate to trigger any one of the Zener diodes 99a. The second string shot 66 will be detonated simply by shifting the rheostat in a direction to increase the applied voltage to a value triggering the upper one of diodes 99a. In this same manner the operator can proceed to detonate cords 66' and 66'' in any desired time interval by regulation of rheostat 96.

He may then proceed to detonate the remainder of the cords by returning the rheostat to its initial position and close switch 95 in the opposite direction thereby reversing the polarity of the applied voltage. The operator then proceeds to adjust the voltage in steps as before to values adequate to fire cords 65', 65'', 65'''.

Should the operator desire to fire more than one cord simultaneously, he adjusts the voltage regulator 96 to the appropriate voltage known as required to assure triggering the desired number of diodes and then closes the switch in the proper direction to trigger these selected diodes.

It will therefore be apparent from the foregoing that a highly versatile apparatus and technique has been provided for performing string shot service operations on oil wells having faulty flow characteristics. The technique makes it possible to employ any desired number of string shots using the smallest available grain rating and including a series of larger grain ratings and to explode these in succession or in any desired groupings until full flow conditions are restored. The technique permits well flow tests to be conducted between individual detonations to determine the effectiveness thereof, following which additional explosions of any selected size and number may be performed or, if tests show that full flow has been restored, the servicing operation can be immediately discontinued and the wire line withdrawn from the well.

The withdrawal operation is performed after opening cover 17 and then reeling in the line until the discriminator 97 and the centralizer exit from the well head. These are removed as are successive other centralizers in a simple and expeditious manner until the withdrawal operation has been completed.

While the particular apparatus and method of conducting string shot operations herein shown and disclosed in detail is fully capable of attaining the objects and providing the advantages hereinbefore stated, it is to be understood that it is merely illustrative of the presently preferred embodiments of the invention, and that no limitations are intended to the details of construction or design herein shown other than as defined in the appended claims.

I claim:

1. In string shot apparatus for use in an oil well to restore free flow conditions, that improvement which comprises: wire line means including an electrically insulated pair of conductors along a major portion thereof and provided with a weight at its lower end to facilitate lowering thereof into the well, a plurality of centralizers distributed along the lower portion of said wire line means, a plurality of explosive cord means extending lengthwise of said wire line means and past a plurality of said centralizers and including means utilizing said centralizers to support said cord means radially inwardly of the casing wall to avoid risk of damage to said cord means while being moved axially of the well, and electrical discriminator means free of moving parts interconnecting the lower ends of said pair of conductors and each of said explosive cord means and operable from the upper end of the well to detonate said explosive cord means at will independently of one another.

2. Apparatus as defined in claim 1 characterized in that said centralizers include a main body formed with slot means opening through one sidewall thereof and sized to embrace a portion of said wire line means from one side thereof, means for holding said centralizers releasably assembled to different selected portions of said wire line means and readily and quickly manipulatable to secure and release individual ones of said centralizers to and from said wire line means as the latter is being lowered into or raised out of the top of the well thereby to permit reeling and unreeling the wire line means.

3. Apparatus as defined in claim 1 characterized in that said explosive cord means and the support therefor includes means for minimizing elongation of said explosive cord means caused by frictional fluid drag forces thereon while being moved lengthwise of a well containing fluid.

4. Apparatus as defined in claim 1 characterized in that said support means for said explosive cord means includes multiple anchorages spaced apart lengthwise of the lower portion of said wire line means and contiguous portions of said explosive cord means and effective to limit the magnitude of tensile stresses applied to said explosive cord means by frictional drag forces as the same is being moved lengthwise of a well containing fluid.

5. Apparatus as defined in claim 1 characterized in the provision of closure means detachably securable to the upper end of the well casing and including a non-conductive seal about said wire line means and effective to seal the well closed while said explosive cord means is being detonated to clear the fluid flow perforations in the casing, and said closure means including readily opened and closed cover means with manually operable means for locking and unlocking the same and effective to prevent fluid from being expelled from the top of the well due to a rise in well pressure caused by said detonation.

6. In a string shot apparatus for use in an oil well to restore free flow conditions by detonating an explosive charge extending lengthwise of the well, that improvement which comprises: wire line means having an electrically insulated pair of conductors extending along a major portion thereof and provided with a weight at its lower end to facilitate lowering thereof into the well, a plurality of centralizers distributed along the lower portion of said wire line means, readily operated means mounted on said centralizers and cooperating with means fixed to said wire line for holding said centralizers detachably in place on said wire line means and against movement therealong and whereby said centralizers are adapted to be individually and expeditiously secured to and removed therefrom as the successive mounting areas therefor along said wire line reach an assembly station at the upper end of the well casing whereby portions of said wire line means about to be coiled on a storage reel are free of said centralizers and whereby portions of the wire line about to enter the well casing can be readily equipped with said centralizers.

7. Apparatus as defined in claim 6 characterized in that said centralizers are slotted lengthwise of one side thereof for assembly onto said wire means from one lateral side thereof.

8. Apparatus as defined in claim 6 characterized in that said means for holding said centralizers assembled to said wire line means includes means fixed to said wire line means and engageable with a centralizer to prevent the latter from moving lengthwise of the wire line means while assembled thereto.

9. Apparatus as defined in claim 8 characterized in that said holding means fixed to said wire line means comprises collar means having a radial surface thereof adapted to abut a radial surface of a centralizer to limit the movement thereof axially of said wire line means.

10. Apparatus as defined in claim 8 characterized in the provision of a single holding means secured to said wire means for each associated centralizer means.

11. Apparatus as defined in claim 1 characterized in that said electrical discriminator means for detonating said explosive cord means independently of one another includes semiconductor means arranged to pass current to a selected one of said explosive cord means only when current of predetermined polarity is applied thereto.

12. Apparatus as defined in claim 1 characterized in the provision of blow out protector means secured to the casing inlet and including cover means having means for securing the same releasably in closed position across the casing inlet after said wire line means has been adjusted to a desired operating position and non-conductive gasket means carried by said blow out protector means effective to provide a fluid-tight electrical non-conductive seal with said wire line means.

13. Apparatus as defined in claim 1 characterized in that said electrical means for detonating said explosive cord means includes a plurality of semi-conductor means connected in parallel and in opposition to one another polarity-wise between the lower ends of said pair of conductors and respective detonator means for said plurality of explosive cord means whereby neither can be detonated until and unless a potential of the proper polarity is applied to said pair of conductors.

14. In string shot apparatus for use in an oil well to recondition the well casing perforations, that improvement which comprises: flexible wire line means readily stored on and dispensed from a storage reel, said wire line means being weighted at its lower end and equipped with at least one pair of electrical conductors, means for supporting explosive cord means lengthwise of said flexible wire line means at a plurality of points therealong with a detonator therefor connected in circuit with the lower ends of said pair of conductors, said explosive cord means and the support means therefor including means for protecting said explosive cord means against tensile strain in excess of a value interfering with the detonation of substantially the full length thereof.

15. A string shot apparatus as defined in claim 14 characterized in the provision of a plurality of independently supported ones of said explosive cord means each equipped with separate detonator means, and electrical means including electrical discriminator means interconnecting said detonators and said one pair of conductors and a source of electrical energy operable to energize said detonators in any desired time delayed sequence by electrical energy having characteristics differing from those utilized to detonate any other one of said detonators.

16. A string shot apparatus as defined in claim 14 characterized in that said discriminator means includes a pluraliy of solid state electronic flow control devices.

17. String shot apparatus as defined in claim 15 characterized in that said support means for said explosive cord means includes a plurality of separate ties closely spaced to one another and secured to said wire line means along the lower portion thereof and cooperating to limit the tensile stress due to frictional drag forces acting on said explosive cord means to a value substantially free of adverse operational effect on the functioning of said explosive cord means.

18. In a string shot apparatus for use in an oil well to recondition the well casing perforations and of the type utilizing a weighted wire line means having a pair of electrical conductors extending therealong for use in detonating explosive cord along the lower end of the wire line means, that improvement which comprises: means for supporting a plurality of independent explosive cords along the side of the wire line means, a separate detonator for each explosive cord including means connecting each thereof in circuit with said pair of conductors and with a source of direct current, said circuit means including electrical discriminator means to activate said detonators in sequence at time intervals selected by an operator and including means for supplying electrical energy individually to said separate detonators by way of said pair of conductors.

19. String shot apparatus as defined in claim 18 characterized in that said discriminator means includes a plurality of polarity responsive devices and control means for reversing the polarity of the power supply to said circuit means.

20. String shot apparatus as defined in claim 18 characterized in that said discriminator means includes a plurality of sets of voltage sensitive semi-conductor means and means for varying the voltage applied to said circuit means to activate first one and then another set of said semi-conductor means.

21. String shot apparatus as defined in claim 18 characterized in that said discriminator means includes both polarity and voltage responsive means so arranged and connected in said circuit means along with polarity and voltage control means that said discriminator means is operable to activate first one and then another of said detonator means.

22. String shot apparatus as defined in claim 14 characterized in that said means for protecting said explosive cord means includes means for anchoring the latter to said wire line means at spaced intervals thereby utilizing the weighted wire line means to isolate tension forces present in sections of said explosive cord means to either side of a particular one of said anchoring means.

23. String shot apparatus as defined in claim 1 characterized in that said explosive cord means include means extending therealong effective to resist stretching of said explosive cord means to an extent interrupting the detonation of the full length thereof.

24. String shot apparatus as defined in claim 6 characterized in the provision of a length of explosive cord secured to said wire line means along portions thereof equipped with said centralizers with one of said explosive cords provided with detonator means connected in electrical circuit with said pair of conductors, and said explosive cord including means extending therealong effective to resist stretching of said explosive cord and interruption of an explosive charge enclosed therein.

25. A string shot apparatus as defined in claim 14 characterized in that said means for supporting said explosive cord means includes built-in stretch resisting means effective to safeguard against malfunctioning of said explosive cord means caused by excess tensile strain and the stretching thereof.

26. A string shot apparatus as defined in claim 14 characterized in that said means for supporting said explosive cord means having a sheath including substantially non-stretching filament means extending therealong effective to safeguard said explosive cord means against stretching.

27. A string shot apparatus as defined in claim 14 characterized in that said explosive cord means secured to said wire line means in a manner protecting the same against tensile strain sufficient to interfere with the detonation thereof is of 30 grain size or less.

28. String shot apparatus as defined in claim 14 characterized in that said wire line means includes a series of centralizers mounted thereon at spaced apart intervals along the portion thereof supporting said explosive cord means and effective to hold said explosive cord means generally centrally of the well and spaced from the well sidewall.

29. A string shot apparatus as defined in claim 14 characterized in that said wire line means includes a series of centralizers mounted thereon at spaced apart intervals between the opposite ends of said explosive cord means and designed for expeditious attachment to and detachment from said wire line means from the side thereof as the area of attachment to the wire line means approaches the mouth of the well.

30. A string shot apparatus as defined in claim 29 characterized in that said means for securing said centralizers to said wire line means includes means operable in the attached position of said centralizers to prevent rotation thereof about the axis of said wire line means and the attending risk of twisting said explosive cord means and straining the same.

31. A string shot apparatus as defined in claim 14 characterized in the provision of blow out preventor means readily attachable to and detachable from the mouth of the well for use temporarily thereon while using said string shot apparatus and including readily opened and closed cover means adapted to be locked closed against said wire line means while said explosive cord means is being detonated.

32. String shot apparatus as defined in claim 14 characterized in that said means for protecting said explosive cord means against tensile strain comprises means securing the same to said wire line means in such manner that tensile forces acting lengthwise of said explosive means are transferred to said wire line means at points intermediate the opposite ends of said explosive cord means.

References Cited
UNITED STATES PATENTS

| | | | |
|---|---|---|---|
| 1,794,278 | 2/1931 | Carney | 308—4(A) |
| 2,655,619 | 10/1953 | Neal | 317—80 |
| 2,790,388 | 4/1957 | MacLeod | 102—21.6 |
| 3,134,437 | 5/1964 | Karpovich | 102—21X |
| 3,118,374 | 1/1964 | Karpovich | 102—20 |
| 3,173,519 | 3/1965 | Sullivan | 174—136 |

VERLIN R. PENDEGRASS, Primary Examiner